Dec. 6, 1938.   O. F. HEER   2,139,080
FERTILIZER DRILL
Filed Dec. 16, 1936   3 Sheets-Sheet 1

Inventor.
Otto F. Heer
By Hazard and Miller
Attorneys.

Dec. 6, 1938.  O. F. HEER  2,139,080
FERTILIZER DRILL
Filed Dec. 16, 1936  3 Sheets-Sheet 2
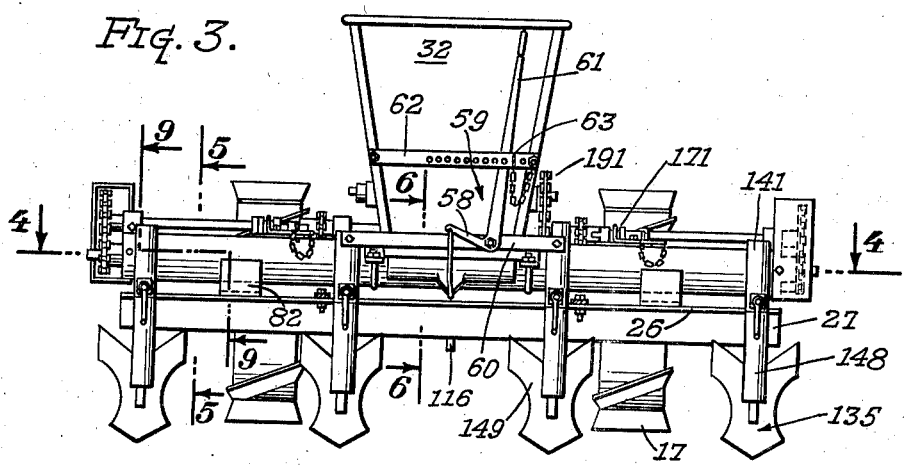
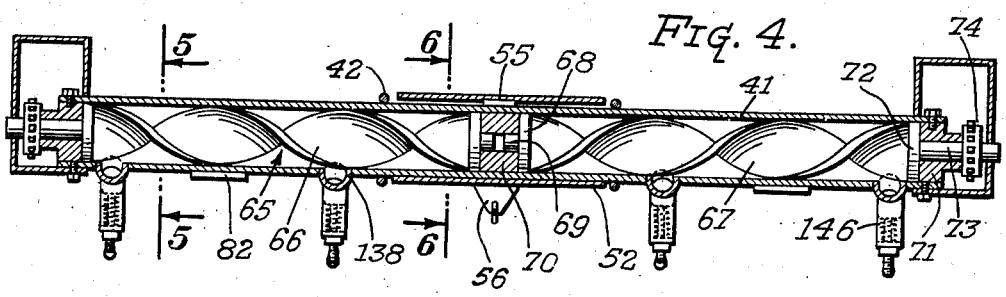
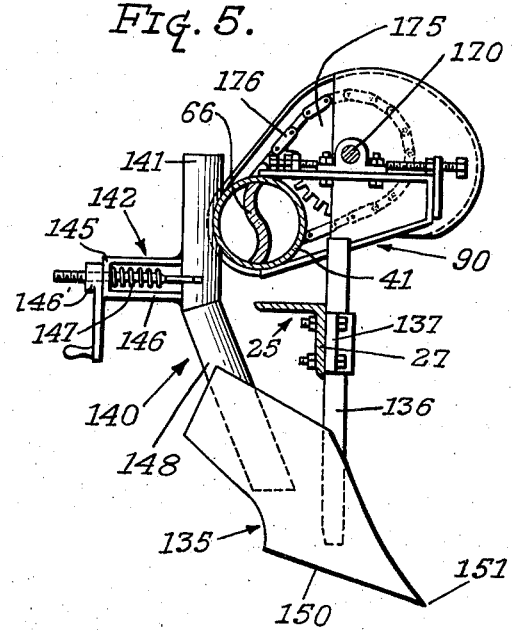
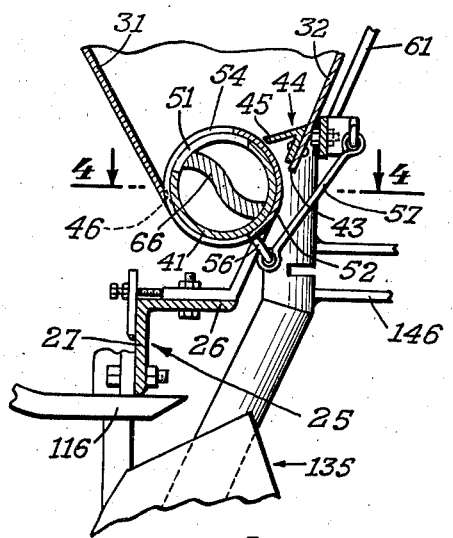
Inventor.
Otto F. Heer
By Hazard and Miller
Attorneys.

Dec. 6, 1938.   O. F. HEER   2,139,080
FERTILIZER DRILL
Filed Dec. 16, 1936   3 Sheets-Sheet 3
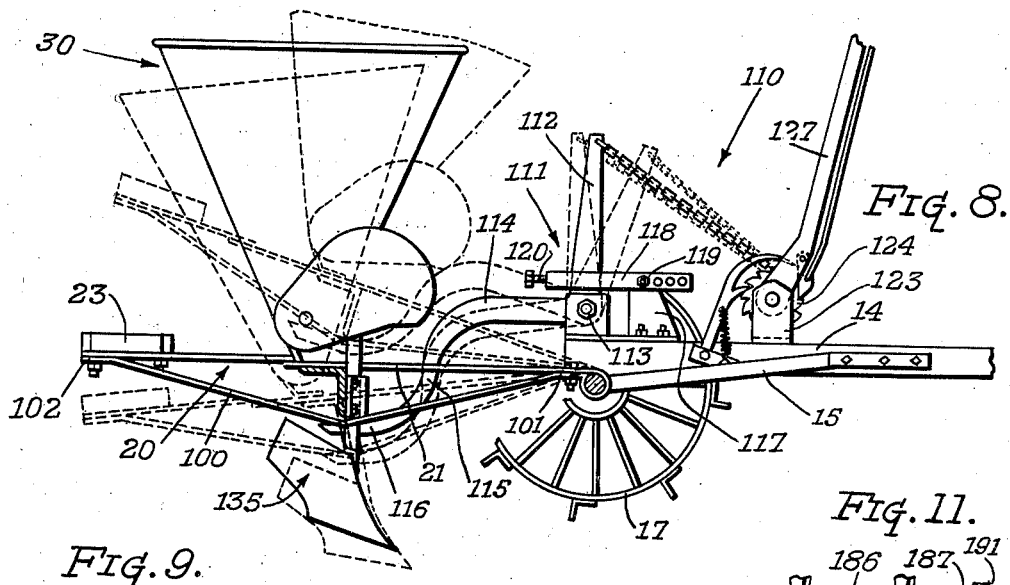
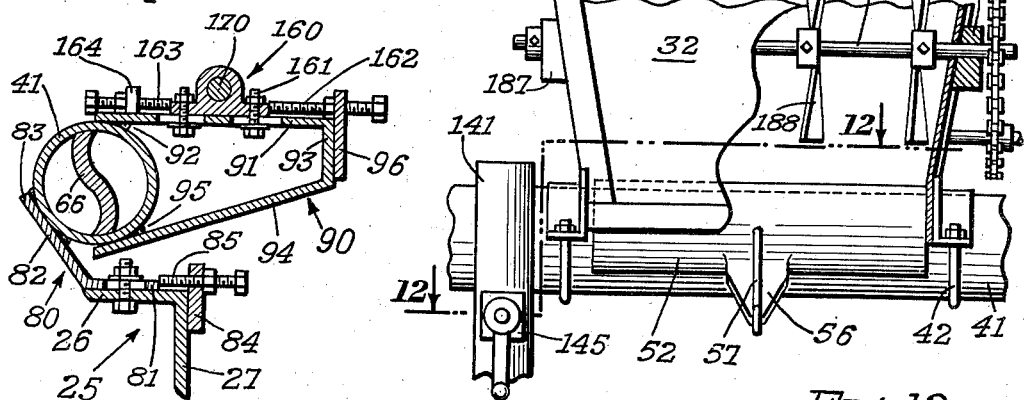
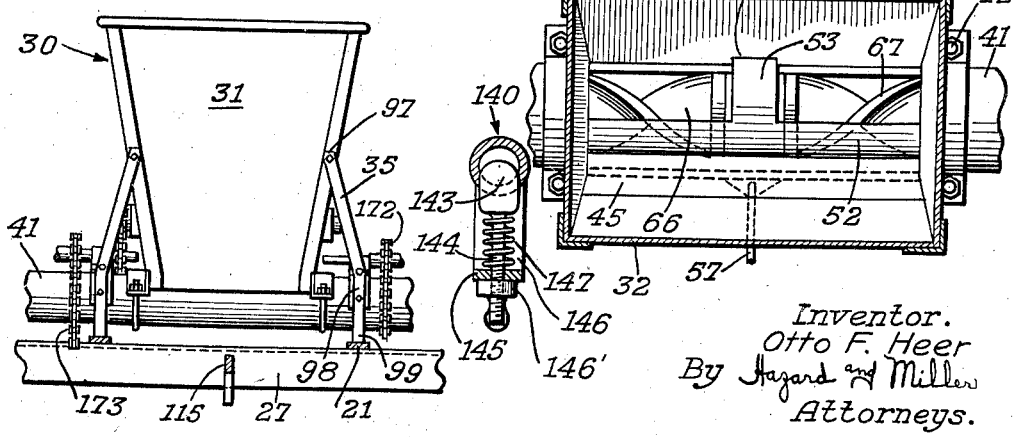
Inventor.
Otto F. Heer
By Hazard and Miller
Attorneys.

Patented Dec. 6, 1938

2,139,080

UNITED STATES PATENT OFFICE 2,139,080

FERTILIZER DRILL

Otto F. Heer, Ontario, Calif.

Application December 16, 1936, Serial No. 116,173

11 Claims. (Cl. 111—52)

My invention relates to a fertilizer drill with features especially adapted for fertilizing orchards with provision for drilling the fertilizer under the foliage of the tree quite close to the trunk, the drilling being accomplished by a machine which may be moved longitudinally of an orchard between the rows of trees.

Therefore one of the main objects and features of my invention relates to a machine mounted on wheels in which the frame of the machine may be quite low to the ground and have a central hopper for carrying a large quantity of fertilizer. From this hopper a pair of tubes or the like extend laterally and have provision such as feed screws for conveying the fertilizer laterally from the hopper through the conveying tubes to various plows or the like which form a furrow, the fertilizer being deposited in the bottom of the furrows. To effect this result the conveying tube is provided with a plurality of down or drop spouts, each controlled by a valve so that the fertilizer fed laterally in the conveyor tube pours downwardly through the spouts which each discharge back of a plow.

My invention further comprehends controlling features for feeding and depositing the fertilizer in that a main valve is provided in the bottom of the hopper leading to the conveyor tube, this valve having an external control mechanism so that it may be set to allow feeding of variable amounts of fertilizer from the hopper to the conveyor screws, these screws operating in opposite directions to feed the fertilizer laterally. Such an arrangement of the main valve control of the quantity of fertilizer fed laterally together with the individual valves at the depositing spouts gives an accurate regulation of the fertilizer feed to any furrow. On account of the fertilizer feeding tubes extending laterally from the hopper and being positioned relatively low as regards the ground level the machine may be moved along a row of trees with the hopper clearing the branches of the trees and the conveyor tubes with the plows extending underneath the foliage towards the trunk of the trees. Another object and feature of my invention in regard to the feeding of the fertilizer employs moving devices such as paddles positioned above the main valve at the bottom of the hopper to break up or prevent any bridging of the fertilizer across the hopper and thus maintain a full volume of fertilizer adjacent the valve to be fed into the valve and through the conveyor tubes by the conveying screws.

Another feature of my invention resides in the drive mechanism for the conveyor screws, these preferably being actuated from the supporting wheels of the machine. As it is sometimes desirable to only feed the fertilizer laterally through one of the tube conveyors I provide clutch controlled drives so that one or other or both of the conveyor screws may be operated. Thus by having a duplicate drive with dual clutches and two drive mechanisms to the conveyor screws the operator may readily control these to feed the fertilizer laterally in both directions or in only one direction. In such latter case all of the plows will be operated but the fertilizer will only be dropped through the discharge spouts to the furrows at one side of the hopper. A further detail feature of my invention consists of continuously operating the breaking up blades in the hopper to loosen the fertilizer whether one or both of the conveyors are leading the fertilizer laterally.

Another object and feature of my invention relates to the mounting of the assembly of plows, drop spouts, conveyor tubes and hopper on a tiltable frame, this being pivotally connected to a vehicle frame so that the whole assembly may be raised or lowered to vary the depth of plowing, that is the depth of the furrows and to deposit the fertilizer in the bottom of these furrows without the necessity of individually regulating the height of the plows and the drop spouts. In this connection a detail feature of my invention resides in forming the vehicle frame with a tow-bar and an axle with supporting wheels and pivoting frame to this axle, the frame extending rearwardly and having the assembly of hoppers, conveyors and plows mounted thereon. The vehicle frame preferably mounted in the tow-bar has a provision for raising and lowering a lever which gives the arcuate movement to this trailing frame.

My invention is illustrated in connection with the accompanying drawings, in which:

Fig. 3 is a rear elevation taken in the direction of the arrow 3 of Fig. 1 or 2.

Fig. 4 is a detail horizontal section on the line 4—4 of Fig. 3 in the direction of the arrows through the lateral conveyors.

Fig. 5 is a vertical longitudinal section on the line 5—5 of Fig. 3 or 4 in the direction of the arrows.

Fig. 6 is a detail vertical longitudinal section taken on the line 6—6 of Fig. 3 or 4 in the direction of the arrows.

Fig. 8 is a side elevation taken in the direction of the arrow 8 of Fig. 1, certain portions being omitted to illustrate the variable positions of the tilting frame carrying the hopper and plows.

Fig. 9 is a detail longitudinal section on the line 9—9 of Fig. 3 in the direction of the arrows showing the support of the conveyor tube and hence the hopper and certain adjustable bearings.

Fig. 10 is a vertical transverse section on the line 10—10 of Fig. 2 in the direction of the arrows omitting minor details.

Fig. 11 is an enlarged rear elevation of the hopper portion of Fig. 3 with parts broken away.

Fig. 12 is a detail horizontal section on the line 12—12 of Fig. 11 taken in the direction of the arrows.

Figure 1:
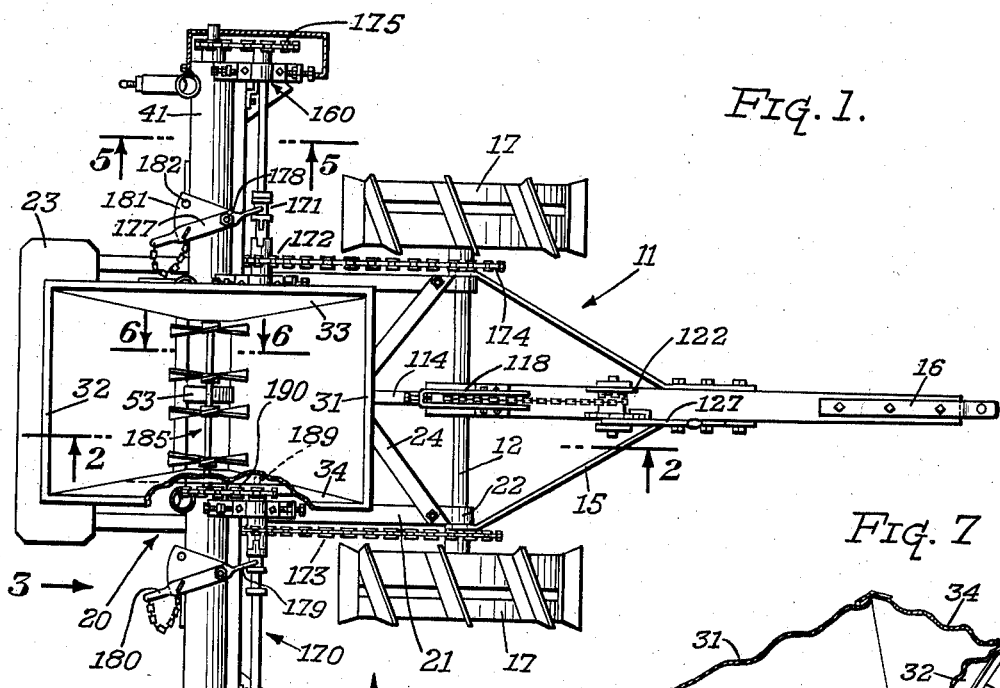
Fig. 1 is a plan taken in the direction of the arrow 1 of Fig. 2.

In my invention I employ what may be designated as a vehicle body or structure 11 having an axle 12 with journal blocks 13 mounted thereon and a towing tongue or tow-bar 14 attached to these blocks. The lateral braces 15 connect from the tow-bar to the side portions of the axle. At the forward end of the tow-bar is a towing connection 16 for attachment to a tractor or the like. On each end of the axle there are supporting wheels 17, these having grousers to engage the soil and to give traction for operating the conveyor screws and other moving parts used in distributing the fertilizer.

A tilting frame 20 has longitudinal bars or straps 21 pivoted at 22 to the axle 12. These bars have a transverse board 23 at the rear end and diagonal braces 24. A transverse angle 25 extends laterally between the bars 21 and extends beyond said bars a considerable distance outside of the tread of the wheels. Such angle has a horizontal web 26 and a vertical flange 27.

Figure 7:
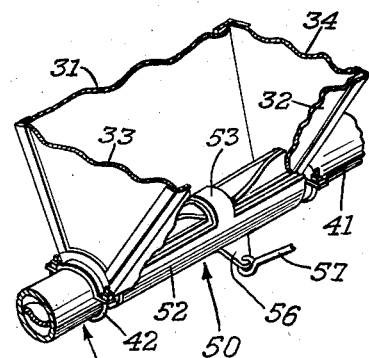
Fig. 7 is a perspective view showing a detail of the hopper and the valve for feeding the fertilizer to the conveyor tubes, portions of the hopper being broken away.

Centrally mounted on the tilting frame 20 there is a large hopper 30, this having sloping front and rear walls 31 and 32 with end walls 33 and 34. The end walls have quite a steep slope as shown in Figs. 1 and 7 compared with the slope of the walls 31 and 32. This hopper is supported from the frame 20 by brace members 35 or the like.

Extending through the bottom of the hopper there is a conveyor assembly 40 which employs a conveyor tube 41. This tube is secured by clamps 42 to the hopper as shown in Fig. 7. A rear wall 32 of the hopper terminates at 43 (note Fig. 6) to give a clearance at the tube and the valve hereinunder detailed. There is also an acute shaped angle 44 secured to this rear wall, this having a flange 45. The lower end of the wall 31 preferably has its lower edge welded to the tube as indicated at 46 of Fig. 6.

The supply valve assembly 50 is provided by having the tube 41 with an opening 51. (Note Fig. 6.) The size of this opening is controlled by a partial sleeve 52 extending partly around the tube, there being a central strap 53 completely encircling the tube at about the center of the hopper. The partial sleeve has an opening 54. The lower part of the front wall 31 has a notch 55 to accommodate the strap 53. This partial sleeve extends substantially the full length of the hopper between the end walls 33 and 34 and between the portion having the clamps 42. It will be understood that instead of using clamps the end portion of the hopper may be welded to the tubes 41. This valve is oscillated by providing an arm 56 extending radially outwardly from the partial sleeve portion. This is shown in its lowermost position in Fig. 6. The link 57 leads from the arm 56 to the short arm 58 of a bell-crank lever 59 (note Fig. 3), this lever being pivoted on a cross-bar 60 mounted on the rear wall 32 of the hopper. This lever has a long arm 61 forming a handle and may be moved across a perforated bar 62 and secured in any desired position by a pin 63 extending through the perforations and engaging the long handle end of the lever. Thus by moving this lever sidewise the link 57 may be moved up or down and hence cause an oscillation of the arm 56 thereby moving the partial sleeve 52 to make a full registry of the opening or port 51 in the conveyor tubes and the open portion 54 of the partial sleeve. Manifestly by turning the sleeve the size of the feed opening communicating with the conveyor tubes may be varied.

The conveyor assembly 40 also includes conveyor screw assemblies 65 in which there are two screws 66 and 67. Each of these terminates in an inner head 68 with a stub axle 69 thereon fitting in the bearing block 70 centrally positioned in the tube 41, this block and the strap 53 being preferably in longitudinal alignment. The outer end of each tube is closed by a bearing block 71 and each screw has an outer head 72 and end axle 73 extending through the bearing block. Each axle is provided with a sprocket gear 74.

The structures for supporting the conveyor tube 40 and the hopper 30 employs a pair of obtuse angles 80 (note particularly Fig. 9). Each of these has a horizontal flange 81 with a slot therein and a bolt through the slot engaging the horizontal web 26 of the transverse angle 25. A rearwardly and upwardly extending web 82 at an obtuse angle has the conveyor tube 41 welded thereto as indicated at 83. A strap 84 secured to the vertical flange 27 of the angle 25 has an adjusting screw 85 which engages the flange 81 and may be utilized to adjust the position of the tube 41 and hence the hopper relative to the main tilting frame 20. Connected to the tube 41 there are four bearing brackets 90 (note particularly Figs. 5 and 9). Each of these has a horizontal bearing plate or strap 91 welded at 92 to the upper part of the tube 41, the strap having one or more slots. An end vertical strip 93 extends downwardly and a sloping strap 94 has its rear end 95 welded to the underside of the tube 41. (Fig. 9.) A strap 96 is welded to the vertical strip 93. Four of these bearing brackets (note Figs. 1 and 2) are employed and the brace members 35 secured to the hopper as indicated at 97, Fig. 10, are attached to the forward end of the bearing brackets as indicated at 98 (note Fig. 10). The lower ends 99 have a riding contact with the longitudinal bars or straps 21. In order to give additional stiffness to the tilting frame 20, sloping brace members 100 (note Fig. 8) extend from adjacent the forward end 101 of the straps 21 passing underneath the vertical flange 27 of angle 25 and are secured at 102 to the rear end of these straps under the board 23.

Figure 2:
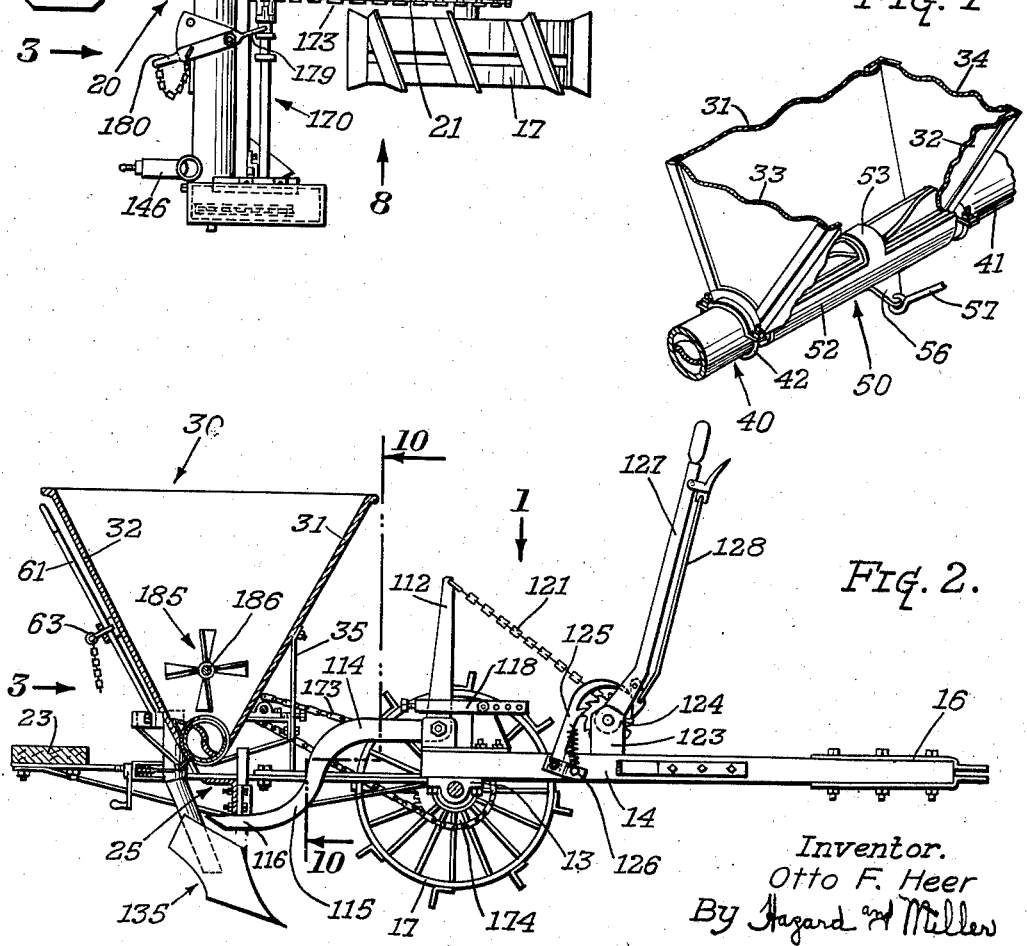
Fig. 2 is a longitudinal vertical section on the line 2—2 of Fig. 1 in the direction of the arrows.

The tilting assembly 110 for raising and lowering the tilting frame 20 in reference to the vehicle frame 11 includes a bell crank lever 111 having an upper arm 112 (note Figs. 2 and 8). This bell crank is pivoted at 113 on a journal block supported at the rear end of the tow bar 14. A rear bent arm 114 forms part of the bell crank. This has a downwardly bent section 115 and an end portion 116 extending underneath the vertical flange 27 of the angle 25. This bell crank lever is thus positioned centrally as to the longitudinal line of the hopper. The lever may be held in adjusted positions by employment of a bracket 117 secured to the tow-bar 14. This has an adjustable yoke 118 with perforations connected to the bracket by a bolt 119. A set screw 120 extends through the end of the yoke and engages the arm 112 of the bell crank 111. The operating mechanism for tilting the bell crank includes a chain 121 or the like leading from the upper end of the arm 112 to a winch 122. This winch is journalled in bearing brackets 123 on the tow-bar 14 and has a ratchet wheel 124 engaged by the pivoted pawl 125, this being pivoted on a bracket 126 on the tow-bar. An operating handle 127 is connected to the ratchet wheel and thus to the winch and is provided with a latch 128 also acting on the ratchet wheel. Therefore by moving this lever backwards and forwards the chain 121 may be wound on the winch and thus swing the bell crank 111 and thus raise the tilting frame 20. In this action the end 116 of the long arm 114 has a sliding movement on the vertical flange 27 of the angle 25.

The plows 135 of which four are shown are each mounted on a vertical bar 136 (note particularly Figs. 2, 5, 6 and 8). These bars are secured with clamps 137 to the angle 25. The plows are thus rigidly connected to the tilting frame 20.

The fertilizer is fed from the conveyor tube 41 by discharge spouts 140 (note particularly Figs. 1, 2, 3, 4, 5, 6, 11 and 12). Each of these has an upper or vertical end 141 with a cutout section welded to openings in the tube 41, such connection being indicated at 138, Fig. 4. This provides for the fertilizer being fed by the conveyor screws into these spouts. The conveyor screws rotate in the same direction as the wheels of the vehicle when it is travelling forwardly and thus the fertilizer is pushed upwardly from the bottom of the conveyor tube to the openings in the spouts. Immediately below such openings there is a valve assembly 142 for each spout, this having a gate 143 (note Fig. 12) slidable in a slot in the vertical section 141. From the gate there is a threaded stem 144 which passes through the end 145 of a yoke 146 welded or otherwise secured to the vertical part 141. The stem is adjusted by a crank operated nut 146'. A compression spring 147 bearing between the end piece 145 and the gate 143 is tensioned to move the gate to its closure position therefore the gates are opened by pulling them outwardly by rotation of the crank nut 146'. The lower or discharge end 148 of the spout 140 leads downwardly and forwardly back of each plow, the plow being of the usual construction with flared mold boards 149. Each plow is indicated as having a bottom edge 150 and a cutting point 151. It will thus be seen that when the tilting frame is raised or lowered the plows with their associated spouts for the fertilizer also move together.

On each of the bearing brackets 90 there is an adjustably mounted pillow block assembly 160, each block being mounted on the plate or strap 91 and having clamping bolts 161 through the slots. (Note particularly Fig. 9.) Forward adjusting screws 162 operating through the plate 96 and a rear adjusting screw 163 operating through a stud 164 secured to 91 adjust the position of each pillow block longitudinally. This is used to adjust the drive shaft 170 for operating the conveyor screws. The drive shaft assembly is shown particularly in Figs. 1, 5, 9 and 11. Each shaft 170 is provided with a sliding clutch 171 in order to connect or disconnect the drive from a driven sprocket 172 (note Fig. 1) mounted on the inner end of the shaft assembly 170. From each of these sprockets a sprocket chain 173 extends forwardly over a driving sprocket 174 secured to the axle 12 which is rotated by the wheels 17. Thus by adjusting the pillow blocks 160 adjacent the hopper the tension of the sprocket chains 173 may be regulated and thus any slack taken up. The outer pillow blocks may likewise be adjusted and on the outer ends of the shaft assembly 170 there are sprocket wheels 175 from which a chain drive 176 leads to the sprocket wheels 74 on the stub axles 73 each of which is connected to one of the screws 66 or 67.

The clutch 171 is illustrated as of an ordinary sliding sleeve and spline type, the sprocket wheels 172 having a hub which forms one element of the clutch. A clutch operating lever 177 is mounted on a vertical pivot 178, there being a lever for each clutch and having a yoke 179 engaging a neck of the sliding element of the clutch. The handle end 180 operates over an arcuate plate 181 having a pair of perforations 182 in which a pin may be inserted to hold the lever and the clutch either in open or closed driving position.

The stirring or agitating mechanism 185 has a shaft 186 (note particularly Figs. 1, 2 and 11). Such shaft extends through the end walls 33 and 34 of the hopper and is journalled on the bearing blocks 187 secured to the outside of the hopper ends. This shaft has agitating blades 188 secured thereto and positioned in the hopper above the inlet valve assembly 50 for leading the fertilizer to the screw conveyor. One of the shaft assemblies 170 has a continuation from the sprocket driving hub indicated at 189, Fig. 1. This has a sprocket gear thereon on which there is a sprocket chain drive 190 to a sprocket 191 on the end of the shaft 186. By this arrangement the agitating blades are always driven when the machine is being towed independent of whether either or both of the conveyor screws are being operated. These blades function to prevent a bridging of the fertilizer in the hopper 30 and also break up any lumps so that the fertilizer is readily fed into the valve 50 and hence longitudinally by the screw conveyors. The object of having two clutches is so that either or both of the conveyors may be driven, for as above mentioned, it is sometimes desirable to only feed the fertilizer laterally in one direction from the hopper, the one side of the machine being idle so far as the spreading of fertilizer is concerned.

Various changes may be made in the details of the construction without departing from the spirit or scope of the invention as defined by the appended claims.

I claim:

1. In a device as described, the combination of a vehicle frame having an axle with wheels, a tilting frame pivotally connected to the vehicle frame and extending rearwardly thereof, a hopper positioned on the tilting frame in substantially the longitudinal center of the vehicle, a conveyor tube having an inlet opening extending laterally from the hopper, a conveyor screw rotatably mounted in the conveyor tube, a plurality of spouts connected to the conveyor tube and extending downwardly for discharging material, an arm pivotally mounted on the vehicle frame and having its rear end slidably engaging the tilting frame, means on the vehicle frame to raise or lower said arm, hence to change the elevation of the tilting frame.

2. In a device as described and claimed in claim 1, means to adjust the hopper, the conveyor tube and spouts as an assembly longitudinally of the tilting frame, a flexible drive between the axle and the conveyor screw including a longitudinally adjustable bearing mounted on the tilting frame.

3. In a device as described, the combination of a vehicle having wheels, a frame connected thereto, a hopper positioned on said frame in substantially the longitudinal center of the vehicle, a conveyor tube extending laterally from the hopper and having an inlet opening in the hopper with a valve consisting of a partial sleeve rotatably mounted on the tube, means exterior to the hopper for rotating said sleeve to regulate the opening of the valve, a conveyor screw extending through the tube, a plurality of discharge spouts connected to the tube each having a control valve, plows supported from the frame, each spout discharging adjacent a plow, and a disconnectible drive from the vehicle to the conveyor screw.

4. In a device as described in claim 3, a second conveyor tube extending laterally from the opposite side of the hopper and having a conveyor screw mounted therein with discharge spouts having valves and second plows for the second set of spouts, a disconnectible drive from the vehicle to the second conveyor tube, an agitating means mounted in the hopper above the valve, and a continuous drive to the agitating means including part of the disconnectible drive to the first conveyor screw.

5. In a device as described, the combination of a vehicle having wheels, a frame connected thereto having a hopper mounted thereon in substantial longitudinal center, a pair of conveyor tubes extending laterally from the hopper beyond the wheels and supported by said frame, a valve in the hopper including a rotatable sleeve communicating with both tubes, a plurality of plows connected to the frame and spaced laterally from the hopper, a plurality of spouts connected to each tube and each discharging adjacent a plow, a valve for each spout, a power shaft on the vehicle having a pair of sprockets, a pair of driven shafts extending laterally from the hopper and parallel to each conveyor tube, each driven shaft having a sprocket and a sprocket chain connecting to one of the sprockets on the power shaft to develop a continuous drive between the power shaft and the driven shaft, a conveyor screw in each conveyor tube, a drive through a clutch from each driven shaft to each conveyor screw whereby either or both conveyor screws may be operated.

6. In a device as described in claim 5, an agitating shaft mounted in the hopper above the valve and having agitating blades, a sprocket and chain drive from one of the driven shafts to the agitating shaft to give a continuous drive to the agitating shaft whether or not the screw conveyors are operated.

7. In a device as described in claim 5, means to adjust the hopper, the conveyor tubes and the spouts longitudinally of said frame, and means to adjust the driven shafts longitudinally in respect to the hopper to thereby make adjustments for the drive from the vehicle to the conveyor screws.

8. In a device as described, a vehicle frame with means for towing same over the ground, a secondary tilting frame pivoted thereto on a transverse pintle, a bell crank pivotally connected to the vehicle frame and having a rearward arm and an upwardly extending arm with a pulling means, the rearward arm having means to engage the tilting frame, a yoke having a pivotal mounting on the vehicle frame with an adjusting means on the yoke to engage the upper arm of the bell crank and thereby limit the downward tilting of the rear arm of the bell crank and hence the downward tilting of the pivoted tilting frame.

9. In a device as described, the combination of a vehicle frame having wheels and an axle, a secondary tilting pivoted frame pivoted to the axle and having a hopper thereon with laterally extending screw conveyors, a sprocket chain drive from the axle to the screw conveyors maintained by the pivotal connection of the secondary frame to the axle at a constant length, a bell crank pivotally connected to the vehicle frame and having a rear arm and an upper arm with a pulling means, the rear arm having means to engage the tilting frame for raising and lowering same, means to move the upper arm through an arcuate movement, a yoke having a pivotal connection to the vehicle frame and an adjusting means on the yoke to engage the upper arm of the bell crank whereby the movement of the bell crank and hence the amount of downward tilting movement of the tilting frame may be regulated by the said yoke and the adjusting means.

10. In a device as described, the combination of a vehicle frame having an axle with a pair of wheels, a tilting frame pivotally connected to the axle and extending rearwardly therefrom, a hopper on the tilting frame in substantially the longitudinal center of the vehicle, a conveyor tube having an inlet opening extending through the lower portion of the hopper and laterally beyond a wheel and supported on the tilting frame, a screw conveyor operated in said tube, a plurality of discharge spouts connected to the conveyor tube and extending downwardly and spaced laterally from the hopper, the conveyor tube being considerably lower than the top of the hopper whereby the vehicle may be drawn longitudinally of a row of trees with the conveyor tube extending underneath the spread of the trees and the hopper outside of the spread of such trees, a drive shaft mounted on the tilting frame parallel to the conveyor tube, said shaft having a clutch therein, a drive from the axle of the vehicle to part of said shaft, a drive from a second part of the shaft to the conveyor screw, the said clutch being operative to close or open the drive to the conveyor screw.

11. In a device as described, the combination of a vehicle frame having an axle with a pair of wheels, a tilting frame pivotally connected to the axle and extending rearwardly therefrom, a hopper on the tilting frame in substantially the longitudinal center of the vehicle, a conveyor tube having an inlet opening extending through the lower portion of the hopper and laterally beyond a wheel and supported on the tilting frame, a screw conveyor operated in said tube, a plurality of discharge spouts connected to the conveyor tube and extending downwardly and spaced laterally from the hopper, the conveyor tube being considerably lower than the top of the hopper whereby the vehicle may be drawn longitudinally of a row of tress with the conveyor tube extending underneath the spread of the trees and the hopper outside of the spread of such trees, an agitating mechanism in the hopper including an agitating shaft positioned above and parallel to the portion of the conveyor tube having the inlet opening, a drive shaft extending outwardly from the hopper parallel to the conveyor screw and including a driven portion, a drive from the axle to said driven portion, a clutch forming part of the drive shaft to a driving portion and a drive from the driving portion to the conveyor screw, a second drive from the driving portion of the driving shaft to the agitating shaft whereby during the movement of the vehicle the agitating shaft may be continuously operated and the conveyor screw intermittently operated.

OTTO F. HEER.